United States Patent
Yamaguchi et al.

(10) Patent No.: US 10,895,294 B2
(45) Date of Patent: Jan. 19, 2021

(54) DISC ROTOR, PRODUCTION APPARATUS THEREFOR, ROLLER, AND DISC ROTOR PRODUCTION METHOD

(71) Applicant: AISIN TAKAOKA CO., LTD., Toyota (JP)

(72) Inventors: Tomohiro Yamaguchi, Toyota (JP); Yoshitaka Iwase, Toyota (JP); Koji Higaki, Amagasaki (JP)

(73) Assignee: AISIN TAKAOKA CO., LTD., Toyota (JP)

( * ) Notice: Subject to any disclaimer, the term of this patent is extended or adjusted under 35 U.S.C. 154(b) by 41 days.

(21) Appl. No.: 16/316,509

(22) PCT Filed: Jul. 5, 2017

(86) PCT No.: PCT/JP2017/024742
§ 371 (c)(1),
(2) Date: Jan. 9, 2019

(87) PCT Pub. No.: WO2018/012386
PCT Pub. Date: Jan. 18, 2018

(65) Prior Publication Data
US 2019/0301550 A1    Oct. 3, 2019

(30) Foreign Application Priority Data
Jul. 14, 2016   (JP) .................. 2016-139545

(51) Int. Cl.
*F16D 65/12* (2006.01)
*B21D 53/34* (2006.01)
(Continued)

(52) U.S. Cl.
CPC .......... *F16D 65/123* (2013.01); *B21D 39/00* (2013.01); *B21D 53/34* (2013.01); *B21H 1/00* (2013.01);
(Continued)

(58) Field of Classification Search
CPC ........ F16D 65/12; F16D 65/18; F16D 65/123; B21D 39/00; B29D 53/24
(Continued)

(56) References Cited

U.S. PATENT DOCUMENTS 5,152,104 A * 10/1992 Wood .................. B24B 7/17
451/269
6,035,978 A    3/2000 Metzen et al.
(Continued)

FOREIGN PATENT DOCUMENTS

EP    0849485 A2    6/1998
JP    3016002 U    10/1994
(Continued)

OTHER PUBLICATIONS

International Search Report (PCT/ISA/210) dated Oct. 3, 2017, by the Japanese Patent Office as the International Searching Authority for International Application No. PCT/JP2017/024742.
(Continued)

*Primary Examiner* — Christopher P Schwartz
(74) *Attorney, Agent, or Firm* — Buchanan Ingersoll & Rooney PC

(57) ABSTRACT

This disc rotor has a hat portion having a cylindrical portion and a sliding plate portion having an insertion hole into which the cylindrical portion is inserted, being connected together with the hat portion in a state in which the cylindrical portion protrudes from the insertion hole. The coupling is achieved by pinching an inner peripheral edge of the sliding plate portion between a first portion and a second portion that are formed in the cylindrical portion. The second portion is formed by plastically deforming an outer peripheral side of the cylindrical portion toward the first portion.

8 Claims, 12 Drawing Sheets

(51) Int. Cl.
  *B21H 1/02* (2006.01)
  *B21H 1/00* (2006.01)
  *B21D 39/00* (2006.01)
  *B24B 7/16* (2006.01)
  *F16D 65/02* (2006.01)

(52) U.S. Cl.
  CPC ............... *B21H 1/02* (2013.01); *F16D 65/12* (2013.01); *F16D 2065/1356* (2013.01); *F16D 2065/1384* (2013.01); *F16D 2200/003* (2013.01); *F16D 2200/0013* (2013.01); *F16D 2250/00* (2013.01)

(58) Field of Classification Search
  USPC .................. 29/557, 888.04, 888.049, 888.06; 188/218 XL
  See application file for complete search history.

(56) References Cited

U.S. PATENT DOCUMENTS

| | | | |
|---|---|---|---|
| 6,152,270 A | 11/2000 | Giorgetti | |
| 8,151,434 B2* | 4/2012 | Fukao | B24B 7/16 29/557 |
| 10,247,269 B2* | 4/2019 | Iwai | F16D 65/0006 |
| 2014/0298637 A1 | 10/2014 | Fauth | |
| 2016/0238095 A1 | 8/2016 | Dériaz | |
| 2017/0175836 A1 | 6/2017 | Iwai et al. | |

FOREIGN PATENT DOCUMENTS

| | | |
|---|---|---|
| JP | 2014533812 A | 12/2014 |
| WO | 2015058314 A2 | 4/2015 |
| WO | 2016017213 A1 | 2/2016 |

OTHER PUBLICATIONS

Written Opinion (PCT/ISA/237) dated Oct. 3, 2017, by the Japanese Patent Office as the International Searching Authority for International Application No. PCT/JP2017/024742.

International Preliminary Report on Patentability (Form PCT/IPEA/409) dated Jun. 5, 2018, by the International Bureau of WIPO in corresponding International Application No. PCT/JP2017/024742 and an English Translation of the International Preliminary Report on Patentability. (15 pages).

Office Action (Examination Report) dated Sep. 4, 2020, by the Intellectual Property India in corresponding India Patent Application No. 201917005154 with an English Translation of the Office Action. (5 pages).

* cited by examiner

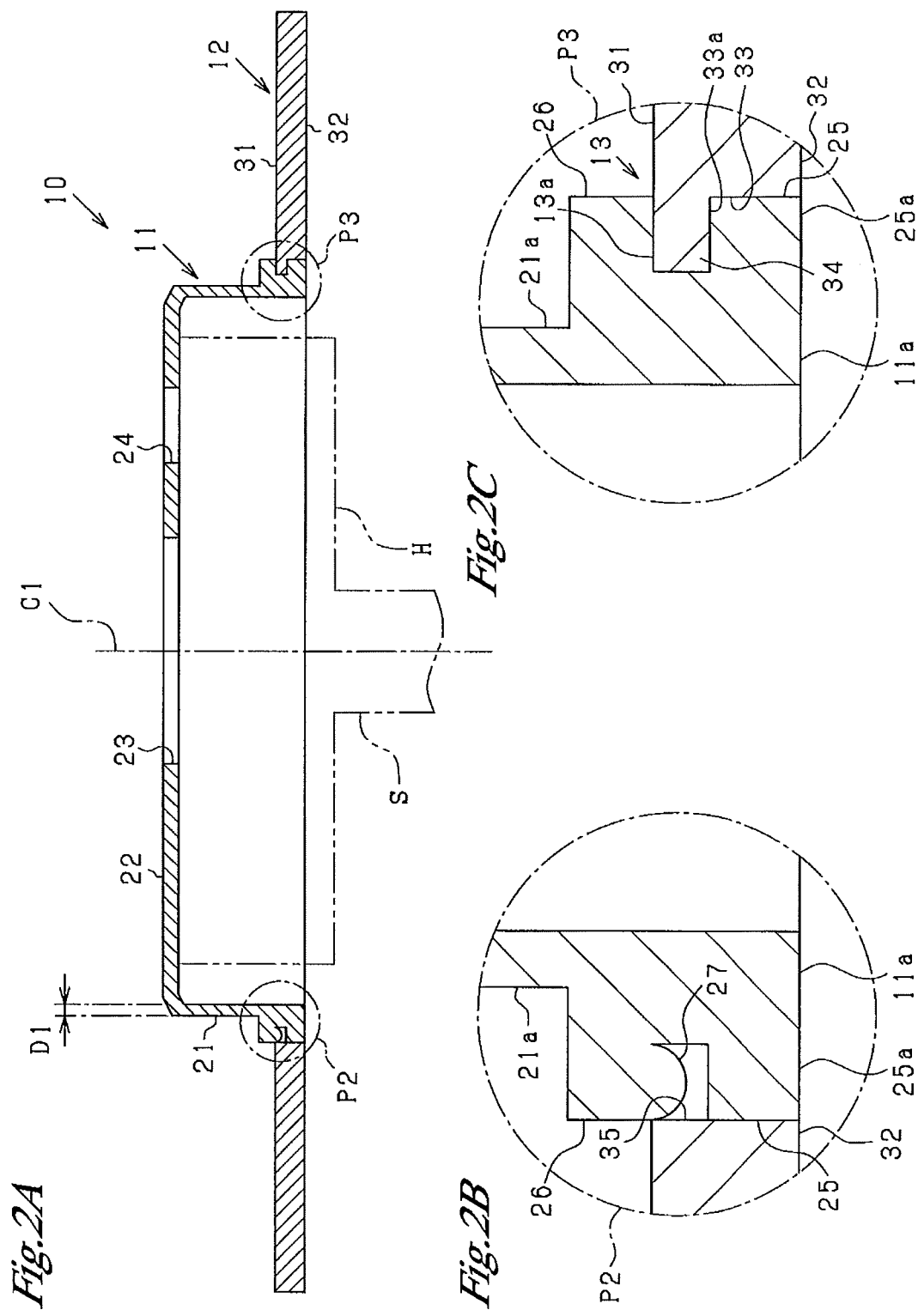

DISC ROTOR, PRODUCTION APPARATUS THEREFOR, ROLLER, AND DISC ROTOR PRODUCTION METHOD

CROSS REFERENCE TO RELATED APPLICATION

The present application is based on Japanese Patent Application No. 2016-139545 filed on Jul. 14, 2016, and the entire contents of that application is incorporated in the this specification.

TECHNICAL FIELD

The present invention relates to a disc rotor and a production apparatus therefor, to a roller incorporated in the disc rotor production apparatus, and to a method of producing the disc rotor.

BACKGROUND ART

A disc brake has been known as a brake of a vehicle such as an automobile. The disc brake includes a disc rotor and disc pads. The disc rotor has a hat-like portion (hereinafter referred to as a "hat portion") connected to an axle and an annular sliding plate portion provided on the outer periphery side of the hat portion. When the vehicle is to be braked, the disc pads squeeze the sliding plate portion of the disc rotor rotating together with the axle. As a result, rotation of the axle is retarded by means of friction produced between the disc pads and the sliding plate portion of the disc rotor.

Conventionally, the disc rotor has been formed of cast iron such that the hat portion and the sliding plate portion are integrated together. The sliding plate portion, which is squeezed by the disc pads during the braking of the vehicle, generates frictional heat when squeezed. Thus, a thermal stress is generated in the sliding plate portion due to the difference in temperature between the sliding plate portion and the hat portion. Therefore, in the above-mentioned conventional structure, the sliding plate portion thermally deforms due to the thermal stress. This has been a cause of generation of vibration during the braking of the vehicle.

In view of the above, there has been proposed a two-piece structure in which the hat portion and the sliding plate portion are constituted by separate members; i.e., a hat member and a sliding plate member, and the two members are integrally connected together (see, for example, Patent Document 1). A disc rotor employing such a two-piece structure allows employment of a structure in which a space for absorbing thermal expansion of the sliding plate member is formed between the hat member and the sliding plate member, so that thermal deformation of the sliding plate member is suppressed.

PRIOR ART DOCUMENT

Patent Document

Patent Document 1: Japanese Kohyo Patent Publication No. 2014-533812

SUMMARY OF THE INVENTION

Problems to be Solved by the Invention

Incidentally, the disc rotor described in Patent Document 1 employs, as a structure for connecting the hat member and the sliding plate member together, a structure in which concave and convex portions are formed on the hat member and the sliding plate member, and the concave and convex portions are fitted together and fixed together through crimping. In such a structure, each concave and convex portion must been machined accurately so as to prevent occurrence of play at the connection between the hat member and the sliding plate member. Further, after the work of fitting together the concave and convex portions of the hat member and the sliding plate member, the work of fixing the concave and convex portions through crimping must be performed. The structure which requires such accurate machining and crimp-fixing work has the problems of increasing the cost involved in production of the disc rotor and lowering productivity.

An object of the present disclosure is to provide a disc rotor which can reduce production cost and increase productivity despite employment of a two-piece structure and to provide a production apparatus for the disc rotor. Another object of the present disclosure is to provide a roller incorporated in the disc rotor production apparatus and to provide a method of producing the disc rotor.

Means for Solving the Problems

A first disclosure which accomplishes the above-described objects is a disc rotor includes a hat portion having a cylindrical portion which a one open end portion of the cylindrical portion is closed, and an annular sliding plate portion having an insertion hole into which the cylindrical portion is inserted, being connected together in a state in which the cylindrical portion protrudes from the insertion hole, a first portion which protrudes outward from an outer peripheral surface of the cylindrical portion; and a second portion which protrudes outward from an outer peripheral surface of the cylindrical portion in an opposite side of the first portion across the inner peripheral edge portion of the sliding plate portion in an axial direction of the cylindrical portion and is configured to pinch an inner peripheral edge portion of the sliding plate portion in corporation with the first portion, as a result of an outer peripheral portion of the cylindrical portion being plastically deformed by being compressed toward the first portion.

In a second disclosure, the disc rotor of the first disclosure further includes a rotation restriction portion which is configured to restrict relative rotation of the hat portion and the sliding plate portion in a circumferential direction of the sliding plate portion.

In a third disclosure, the disc rotor of the second disclosure is configured that the rotation restriction portion includes a concave portion which is located at the inner peripheral edge portion of the sliding plate portion and is formed on a plate surface which faces the second portion and a convex portion which is formed together with the second portion as a result of the outer peripheral portion of the cylindrical portion being plastically deformed by being compressed toward the first portion and which protrudes into the concave portion.

In a fourth disclosure, the disc rotor of the third disclosure is configured that the first portion is provided at an opening-side end portion of the hat portion, and an accommodation space for accommodating the first portion is provided at the inner peripheral edge portion of the sliding plate portion.

In a fifth disclosure, the disc rotor of the fourth disclosure is configured that the sliding plate portion has a plurality of protrusions each of which protrudes toward the insertion hole side from the inner peripheral edge portion at a position biased to a side of the second portion; the plurality of protrusions are provided that the protrusions are spaced from one another in a circumferential direction of the insertion hole and a gap between the protrusions located adjacent to each other serves as the concave portion, and a space which is formed at a side of the first portion of the protrusions in the axial direction serves as the accommodation space.

A sixth disclosure is a disc rotor production apparatus for producing a disc rotor by connecting together a hat member and a sliding plate member, the hat member having a cylindrical portion which a one open end portion of the cylindrical portion is closed and a flange portion provided at an opening-side end portion of the cylindrical portion, the sliding plate member having an insertion hole into which the cylindrical portion of the hat member is inserted, the disc rotor production apparatus includes a temporary assembly holding portion which is configured to hold a temporary assembly of the hat member and the sliding plate member in which the cylindrical portion of the hat member is inserted into the insertion hole of the sliding plate member and an inner peripheral edge portion of the sliding plate member is in contact with the flange portion and a plastic working portion which is in contact with an outer peripheral portion of the cylindrical portion in the temporary assembly held by the temporary assembly holding portion and, in an opposite side of the flange portion across the inner peripheral edge portion of the sliding plate member in the axial direction of the cylindrical portion, is configured to forma second portion which is plastically deformed the outer peripheral portion of the cylindrical portion by compressing the outer peripheral portion toward the flange portion, thereby forming a second portion which is configured to pinch the inner peripheral edge portion in corporation with the flange portion serving as a first portion.

In a seventh disclosure, the disc rotor production apparatus of the sixth disclosure is configured that the plastic working portion has a forming space which is open toward a center axis of the cylindrical portion and toward the flange portion and into which the portion plastically deformed by the plastic working portion is introduced so as to form the second portion.

In an eighth disclosure, the disc rotor production apparatus of the sixth or seventh disclosure further includes a rotational drive portion which is configured to rotate the temporary assembly holding portion about a center axis of the temporary assembly in a state in which the temporary assembly holding portion holds the temporary assembly and a roller on which the plastic working portion is formed to be annular and which is supported to be rotatable about a center axis of the annular plastic working portion.

A ninth disclosure is a roller which is applied to a disc rotor production apparatus, the disc rotor production apparatus is configured to produce a disc rotor from a temporary assembly of a hat member and a sliding plate member, the hat member having a cylindrical portion which an one end portion of the cylindrical portion is closed and a flange portion provided at an opening-side end portion of the cylindrical portion, the sliding plate member having an insertion hole into which the cylindrical portion of the hat member is inserted, the cylindrical portion of the hat member being inserted into the insertion hole of the sliding plate member and the inner peripheral edge portion of the sliding plate member is in contact with the flange portion, the roller is configured to be in contact with an outer peripheral portion of the cylindrical portion in the temporary assembly, and the roller includes an annular plastic working portion which extends circumferentially and, in an opposite side of the flange portion across the inner peripheral edge portion of the sliding plate member in the axial direction of the cylindrical portion, is configured to form a second portion which is plastically deformed the outer peripheral portion of the cylindrical portion by compressing the outer peripheral portion toward the flange portion, thereby forming a second portion which is configured to pinch the inner peripheral edge portion in corporation with the flange portion serving as a first portion and a forming space which is provided in the plastic working portion, which is open toward a center axis of the cylindrical portion and toward the flange portion, and into which the portion plastically deformed by the plastic working portion is introduced to form the second portion.

A tenth disclosure is a disc rotor production method of producing a disc rotor by connecting together a hat member and a sliding plate member, the hat member including a cylindrical portion which an one end portion of the cylindrical portion is closed and a flange portion provided at an opening-side end portion of the cylindrical portion, the sliding plate member having an insertion hole into which the cylindrical portion of the hat member is inserted, the disc rotor production method includes forming a temporary assembly by inserting the cylindrical portion of the hat member into the insertion hole of the sliding plate member until an inner peripheral edge portion of the sliding plate member is in contact with the flange portion and plastically deforming an outer peripheral portion of the cylindrical portion in the temporary assembly by compressing the outer peripheral portion toward the flange portion, thereby forming a second portion which pinches the inner peripheral edge portion in corporation with the flange portion serving as a first portion.

In an eleventh disclosure, the production method of the tenth disclosure is configured that, at the inner peripheral edge portion of the sliding plate member, a concave portion is formed on a plate surface which faces the second portion and forming a convex portion which protrudes into the concave portion together with the second portion by plastically deforming the outer peripheral portion of the cylindrical portion by compressing the outer peripheral portion toward the flange portion.

Effects of the Invention

In the disc rotor as the first disclosure, the inner peripheral edge portion of the sliding plate portion is pinched by the first portion and the second portion provided on the outer periphery of the hat portion. Thus, the hat portion and the sliding plate portion are connected and integrated in such a manner that separation of the hat portion and the sliding plate portion is difficult. As a result, the strength of the disc rotor can be secured despite employment of a two-piece structure.

In addition, the second portion is formed by plastically deforming an outer peripheral portion of the cylindrical portion by compressing the outer peripheral portion toward the first portion. In this case, the only requirement is plastically deforming the outer peripheral portion of the cylindrical portion toward the first portion. Therefore, the process of forming the second portion does not require high accuracy and does not require additional operation such as crimp-fixing. As a result, as compared with the conventional technique which requires, for example, the operation of fitting concave and convex portions and the operation of crimp-fixing, the production cost of the disc rotor can be reduced and productivity can be increased.

In the disc rotor as the second disclosure, since relative rotation of the hat portion and the sliding plate portion is restricted by the rotation restriction portion, the strength of the disc rotor in the rotation direction is secured. The disc rotor rotates together with rotation of an axle and the sliding plate portion is squeezed by brake pads. Therefore, the two-piece structure which secures the strength in the rotation direction can enhance the practical performance of the disc rotor disclosed as the first mode.

In the disc rotor as the third disclosure, the convex portion, which is formed by plastically deforming an outer peripheral portion of the cylindrical portion, protrudes into the concave portion of the sliding plate portion, whereby relative rotation of the hat portion and the sliding plate portion is restricted. This convex portion is formed together with the second portion. Therefore, through the operation of plastically deforming the outer peripheral portion of the cylindrical portion, the hat portion and the sliding plate portion are connected together and, simultaneously, relative rotation of the hat portion and the sliding plate portion is restricted. As a result, the disc rotor in which the hat portion and the sliding plate portion are connected and their relative rotation is restricted can be easily produced. Also, simultaneous formation of the convex portion and the second portion contributes to reduction of production cost and improvement of productivity.

In the disc rotor as the fourth disclosure, the first portion provided at the opening-side end portion of the hat portion is accommodated in the accommodation space formed in the sliding plate portion. Therefore, it is possible to prevent the first portion protruding from the sliding plate portion. Various components which constitute a brake apparatus, etc. are disposed in a space located inward of the opening of the hat portion. It is possible to prevent occurrence of a situation in which securement of a space for disposing these components is hindered by the presence of the first portion.

In the disc rotor as the fifth disclosure, as a result of formation of the plurality of protrusions at the inner peripheral edge portion of the sliding plate portion, the concave portions and the accommodation space are formed simultaneously. Therefore, the cost involved in formation of the concave portions and the accommodation space can be reduced as compared with the case where the concave portions and the accommodation space are individually formed by grooves. Also, since the plurality of concave portions are provided and the convex portions protrude into the respective concave portions, relative rotation is restricted by each of the plurality of concave portions. As a result, the strength of the disc rotor in the rotational direction can be increased.

In the disc rotor production apparatus as the sixth disclosure, in a state in which the temporary assembly of the hat member and the sliding plate member is held by the temporary assembly holding portion, an outer peripheral portion of the cylindrical portion is plastically deformed by the plastic working portion, whereby the second portion is formed. The inner peripheral edge portion of the sliding plate member is pinched by the formed second portion and the flange portion (first portion), whereby the hat member and the sliding plate member are connected together. Accordingly, this disc rotor production apparatus can properly produce a disc rotor having such a connection structure.

Also, in the case where the sliding plate member has a concave portion which is located at the inner peripheral edge portion defining the insertion hole and is formed in the plate surface facing the second portion, the convex portions protruding into the concave portions can be formed together with the second portion by plastically deforming an outer peripheral portion of the cylindrical portion by the plastic working portion. Therefore, a disc rotor in which the convex portions protrude into the concave portions, thereby restricting relative rotation of the hat member and the sliding plate member, can be properly produced.

In the disc rotor production apparatus as the seventh disclosure, the portion plastically deformed by the plastic working portion moves toward the forming space so that that portion is introduced into that space, and the second portion is formed by the introduced portion. Therefore, the second portion can be easily formed into an arbitrary shape; for example, the second portion can be formed such that the second portion has a strength enough to pinch the inner peripheral edge portion of the sliding plate member in cooperation with the flange portion (the first portion).

In the disc rotor production apparatus as the eighth disclosure, in the temporary assembly which rotates as a result of drive by the rotational drive portion, an outer peripheral portion of its cylindrical portion is plastically deformed by the plastic working portion of the roller. At this time, since the roller is rotatably supported, the roller rotates to follow the rotation of the temporary assembly. Since the plastic working portion plastically deforms the outer peripheral portion of the cylindrical portion while rotating, the frictional force acting on the plastic working portion due to friction between the plastic working portion and the outer periphery of the cylindrical portion is reduced, whereby abrasion of the plastic working portion can be reduced.

When the roller as the ninth disclosure is applied to the disc rotor production apparatus, an outer peripheral portion of the cylindrical portion is plastically deformed by the plastic working portion of the roller and is compressed toward the flange portion, whereby the second portion is formed. When the second portion is formed, the portion plastically deformed by the plastic working portion can be introduced into the forming space. Therefore, the roller is preferably used for a disc rotor production apparatus which forms the second portion by plastically deforming the cylindrical portion, thereby connecting the hat member and the sliding plate member together.

In the production method as the tenth disclosure, in the temporary assembly of the hat member and the sliding plate member, the second portion which pinches the inner peripheral edge portion of the sliding plate member in corporation with the flange portion (the first portion) is formed by plastically deforming an outer peripheral portion of the cylindrical portion. As a result, it is possible to produce a disc rotor in which the hat member and the sliding plate member are connected and integrated together in such a manner that separation of these members is difficult and which secures enough strength despite of its two-piece structure. Since this method requires only a process of plastically deforming an outer peripheral portion of the cylindrical portion toward the first portion, the process of forming the second portion does not require high accuracy and does not require additional operation such as crimp-fixing. As a result, as compared with the conventional technique which requires, for example, the operation of fitting concave and convex portions and the operation of crimp-fixing, the production cost of the disc rotor can be reduced and productivity can be increased.

In the production method as the eleventh disclosure, by plastically deforming an outer peripheral portion of the cylindrical portion, the convex portion is formed together with the second portion in such a manner that the convex portion protrudes into the concave portion formed in the sliding plate portion, thereby restricting relative rotation of the hat portion and the sliding plate portion. Through the operation of plastically deforming the outer peripheral portion of the cylindrical portion, it is possible to establish the connection between the hat portion and the sliding plate portion and simultaneously restrict relative rotation of the two portions. Therefore, a disc rotor in which the hat member and the sliding plate member are connected together and relative rotation of the two members is restricted can be produced easily. Also, simultaneous formation of the second portion and the convex portion contributes to reduction of production cost and improvement of productivity.

BRIEF DESCRIPTION OF THE DRAWINGS

The objects described above and other objects, features, and advantages of the present disclosure will be apparent from the following detailed description with reference to the accompanying drawings. In the drawings,
FIG. 2A is a sectional view in FIG. 1;
FIG. 2B is a partial enlarged sectional view showing a part P2 in FIG. 2A;
FIG. 2C is a partial enlarged sectional view showing a part P3 in FIG. 2A.

MODES FOR CARRYING OUT THE INVENTION

An embodiment of the present disclosure will now be described with reference to the drawings. In the present embodiment, the present disclosure is embodied in the form of a disc rotor which is one of components used in a disc brake which is a brake of a vehicle such as an automobile.

Figure 1A:
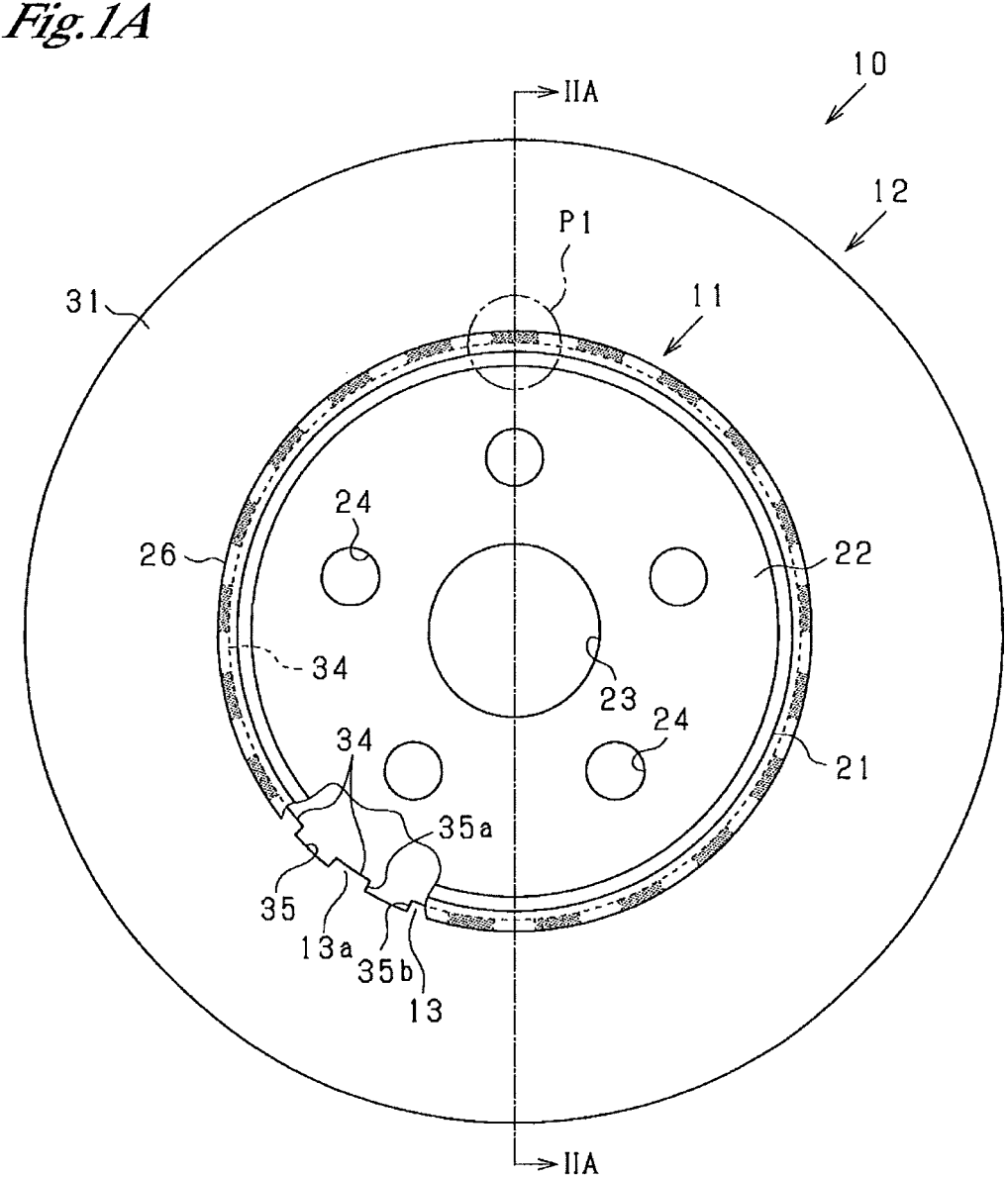
FIG. 1A is a plan view showing a disc rotor.

As shown in FIG. 1A, a disc rotor 10 is composed of a two-piece structure having a hat portion 11 and a sliding plate portion 12. As shown in FIG. 2A, the sliding plate portion 12 is provided around the hat portion 11, and the hat portion 11 protrudes from the sliding plate portion 12.

The hat portion 11 is a portion which is attached to a hub H provided at an end portion of an axle S. The hat portion 11 is formed of an aluminum alloy. The hat portion 11 has the shape of a cylinder which an one end portion is closed and has a cover portion. A part of the hat portion 11, which part forms a cylindrical shape, is a cylindrical portion 21, and the cover portion is an attaching plate portion 22.

The cylindrical portion 21 has a predetermined thickness D1 and extends in the axial direction of the center axis C1 of the disc rotor 10. Accordingly, the center axis C1 is also the center axis C1 of the cylindrical portion 21. An attachment hole 23 is provided in a center part of the attaching plate portion 22 such that the center of the attachment hole 23 coincides with the center axis C1. A plurality of bolt insertion holes 24 are provided around the attachment hole 23. The disc rotor 10 is attached to the hub H through use of the attaching plate portion 22, the attachment hole 23, and the bolt insertion holes 24.

The sliding plate portion 12 is a portion which is squeezed and pressed by disc pads during braking of the vehicle. As shown in FIGS. 1A and 2A, the sliding plate portion 12 is formed of cast iron such that the sliding plate portion 12 has an annular plate-like shape. Front and back surfaces of the sliding plate portion 12 serve as a pair of sliding surfaces 31 and 32 against which the respective disc pads are pressed. The pair of sliding surfaces 31 and 32 is composed of an outside sliding surface 31 and an inside sliding surface 32. The outside sliding surface 31 faces toward the side toward which the hat portion 11 protrudes and faces toward the outside of the vehicle when the disc rotor 10 is attached to the axle S. The inside sliding surface 32 is a surface located on the side opposite the outside sliding surface 31 and faces toward the inside of the vehicle when the disc rotor 10 is attached to the axle S.

The hat portion 11 and the sliding plate portion 12 are connected to each other in a state in which the cylindrical portion 21 of the hat portion 11 protrudes from the center part of the annular sliding plate portion 12. A connecting portion for connecting the hat portion 11 and the annular sliding plate portion 12 is present at an opening-side end portion of the hat portion 11; namely, is present at an end portion on the side opposite the attaching plate portion 22 in the axial direction of the center axis C1. As a result of the opening-side end portion of the hat portion 11 and the inner peripheral edge portion 13 of the sliding plate portion 12 being connected together, the hat portion 11 and the sliding plate portion 12 are integrated together.

Next, the connecting structure will be described in further detail. Notably, in this description, the circumferential direction refers to the circumferential direction of the cylindrical portion 21 of the hat portion 11 (the annular direction of the sliding plate portion 12) in the disc rotor 10.

First, the structure of the sliding plate portion 12 will be described. As shown in FIG. 2C (an enlarged view on the right side), the inner peripheral edge portion 13 of the sliding plate portion 12 has an inside groove 33 which is formed on the inside sliding surface 32 side and serves as an accommodation space. The inside groove 33 is provided over the entire circumference of the inner peripheral edge portion 13. As a result of formation of the inside groove 33, a plurality of inner peripheral protrusions 34 are formed along the inner peripheral edge portion 13 of the sliding plate portion 12 such that the inner peripheral protrusions 34 protrude radially inward parallel to the pair of sliding surfaces 31 and 32. As shown in FIG. 1A, the inner peripheral protrusions 34 are provided such that they are spaced from one another in the circumferential direction (see also FIG. 5 which will be described later). The inner peripheral protrusions 34 correspond to the protrusions.

As shown in FIGS. 1 and 2B (an enlarged view on the left side), the inner peripheral edge portion 13 of the sliding plate portion 12 has a plurality of penetration recesses 35 formed in its inner peripheral plate surface 13a. The penetration recesses 35 are formed to extend between the inside sliding surface 32 and the outside sliding surface 31, and serve as gaps each provided between the adjacent inner peripheral protrusions 34. Accordingly, the penetration recesses 35 correspond to the concave portions. The penetration recesses 35 are provided at predetermined intervals in the circumferential direction, and the inside groove 33 is interrupted in regions where the penetration recesses 35 are present.

Next, the structure of the hat portion 11 will be described. As shown in FIG. 2C (an enlarged view on the right side), a pair of portions 25 and 26 are provided at an opening-side end portion of the cylindrical portion 21. Each of the pair of portions 25 and 26 has a flange-like shape. At the opening-side end portion of the cylindrical portion 21, the pair of portions 25 and 26 extend outward from the outer peripheral surface 21a of the cylindrical portion 21 perpendicularly to the axial direction of the center axis C1. Also, the pair of portions 25 and 26 are provided over the entire circumference of the cylindrical portion 21. The pair of portions 25 and 26 are composed of a first portion 25 and a second portion 26.

The first portion 25 is provided at the opening-side end portion of the hat portion 11. The second portion 26 is provided on the side toward the attaching plate portion 22 of the hat portion 11 with respect to the first portion 25 such that the second portion 26 is spaced from the first portion 25. The length of spacing between the first portion 25 and the second portion 26 is equal to the thickness of the inner peripheral protrusions 34 of the sliding plate portion 12.

As shown in FIG. 2C (an enlarged view on the right side), the hat portion 11 and the sliding plate portion 12 having the above-described structures are combined in such a manner that, in regions where the inside groove 33 is formed, the first portion 25 of the hat portion 11 is accommodated in the inside groove 33 of the sliding plate portion 12. Further, the inner peripheral protrusions 34 of the sliding plate portion 12 are pinched by the first portion 25 and the second portion 26 from the opposite sides in the axial direction of the center axis C1.

In this pinched state, the first portion 25 is in contact with a groove bottom surface 33a of the inside groove 33, and an opening-side end surface 11a of the hat portion 11 and an opening-side end surface 25a of the first portion 25 are flush with the inside sliding surface 32 of the sliding plate portion 12. The second portion 26 is in contact with the inner peripheral plate surface 13a. In each of regions where the inner peripheral protrusions 34 are formed, such by the first portion 25 and the second portion 26 is performed over the entire region. Notably, the inner peripheral plate surface 13a with which the second portion 26 is in contact corresponds to the plate surface facing the second portion 26.

Also, as shown in FIG. 2B (an enlarged view on the left side), in regions where the penetration recesses 35 are formed, the first portion 25 of the hat portion 11 is accommodated in the penetration recesses 35. In this accommodated state, the opening-side end surface 11a of the hat portion 11 and the opening-side end surface 25a of the first portion 25 are flush with the inside sliding surface 32 of the sliding plate portion 12.

Figure 1B:
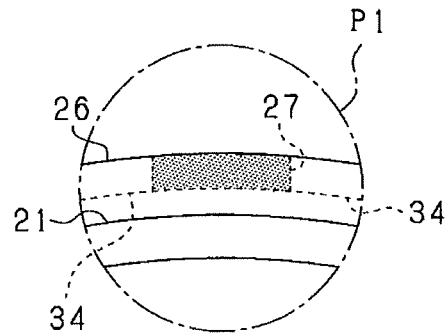
FIG. 1B is a partial enlarged view showing a part P1 in FIG. 1A.

Meanwhile, since the inner peripheral protrusions 34 are not present in the regions where the penetration recesses 35 are formed, the second portion 26 have convex portions 27 protruding into the penetration recesses 35. As shown in FIG. 1B, each of the convex portions 27 protruding into the penetration recesses 35 is contact with side surfaces 35a and 35b of the corresponding penetration recess 35 located on opposite sides in the circumferential direction. Notably, in a plan view as shown in FIG. 1, the convex portions 27 can not be viewed. However, in order to show the presence of the convex portions 27, the convex portions 27 are depicted by half-tone dot meshing.

As described above, in the regions where the inside groove 33 is formed, the inner peripheral protrusions 34 are pinched by the first portion 25 and the second portion 26, and in the regions where the penetration recesses 35 are formed, the convex portions 27 of the second portion 26 protrude into the penetration recesses 35 such that each convex portion 27 comes into contact with the side surfaces 35a and 35b of the corresponding penetration recess 35, which side surfaces are located on opposite sides in the circumferential direction. By the former configuration, the hat portion 11 and the sliding plate portion 12 are connected together. By the latter configuration, relative rotation of the hat portion 11 and the sliding plate portion 12 is restricted. Therefore, the hat portion 11 and the sliding plate portion 12 can be connected together in such a manner that separation and relative rotation of the hat portion 11 and the sliding plate portion 12 hardly occur. Notably, the convex portions 27 and the penetration recesses 35 constitute the rotation restriction portion.

Next, components used for production of the disc rotor 10 having the above-described structure, a disc rotor production apparatus used for production of the disc rotor 10, and a method of producing the disc rotor 10 through use of the disc rotor production apparatus will be described with reference to FIGS. 3 to 10.

First, for production of the disc rotor 10, a hat member 41 and a sliding plate member 46 are individually prepared as shown in FIGS. 3 to 6. The hat member 41 is a member for constituting the hat portion 11 of the disc rotor 10. The sliding plate member 46 is a member for constituting the sliding plate portion 12 of the disc rotor 10. The individual structures of the hat member 41 and the sliding plate member 46 will be described, wherein portions identical with the portions having already been described are denoted by the same reference numerals.

Figure 3:
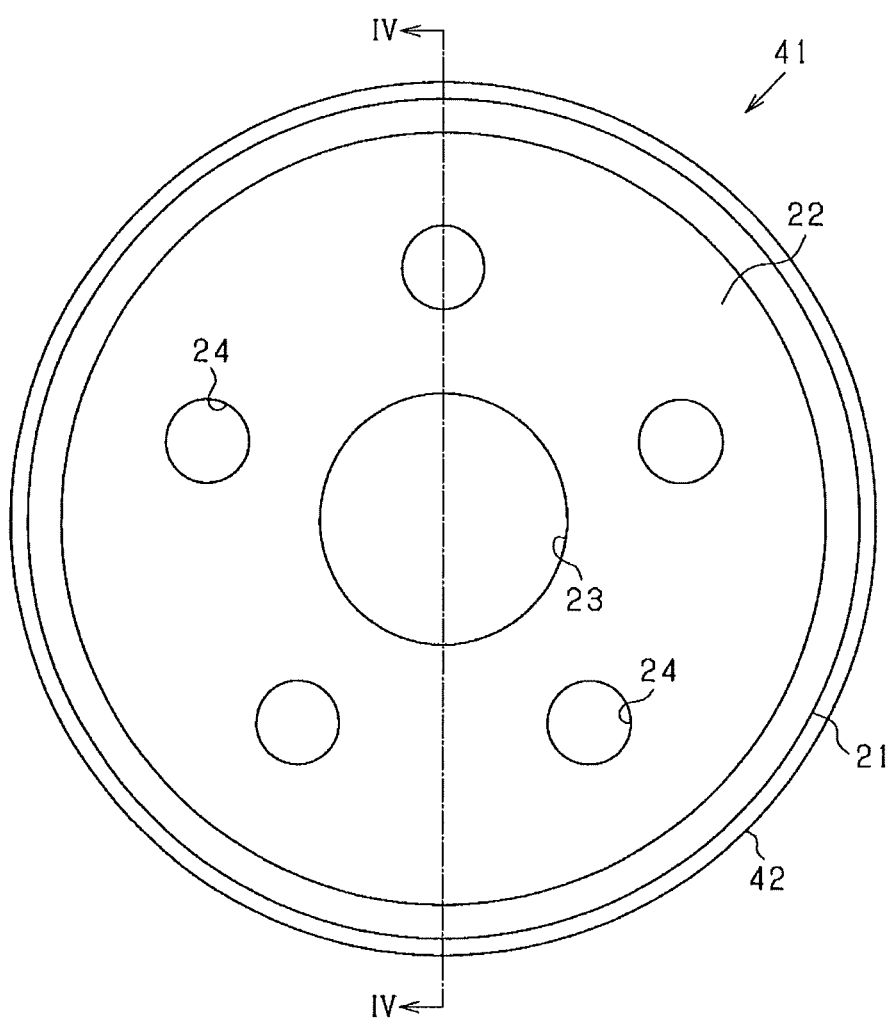
FIG. 3 is a plan view showing a hat member.
Figure 4:
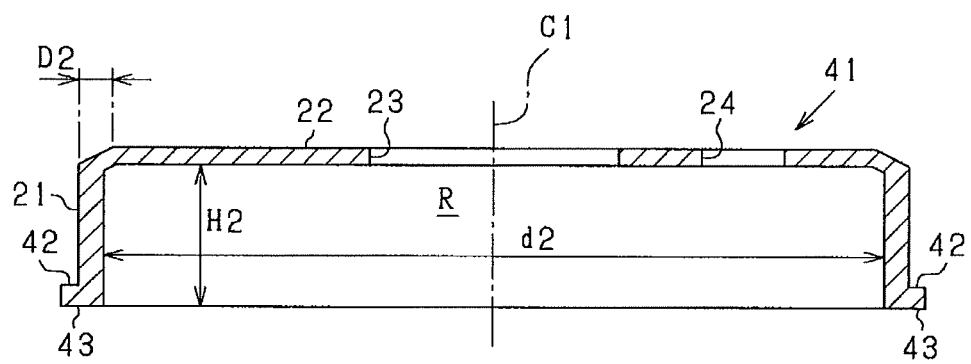
FIG. 4 is a sectional view in FIG. 3.

As shown in FIGS. 3 and 4, the hat member 41 has the shape of a cylinder which an one end portion is closed and has a flange portion 42 in addition to the cylindrical portion 21 and the attaching plate portion 22, which have been described above. The hat member 41 is formed of an aluminum alloy through press working or the like. In the hat member 41, the cylindrical portion 21 has a thickness D2 greater than the thickness D1 of the cylindrical portion 21 in the disc rotor 10 (see FIG. 2A). The flange portion 42 is provided at the opening-side end portion of the hat member 41. The flange portion 42 extends outward from the opening-side end portion perpendicularly to the axial direction of the center axis C1. An opening-side end surface 43 of the flange portion 42 is a flat surface perpendicular to the axial direction of the center axis C1.

Figure 5:
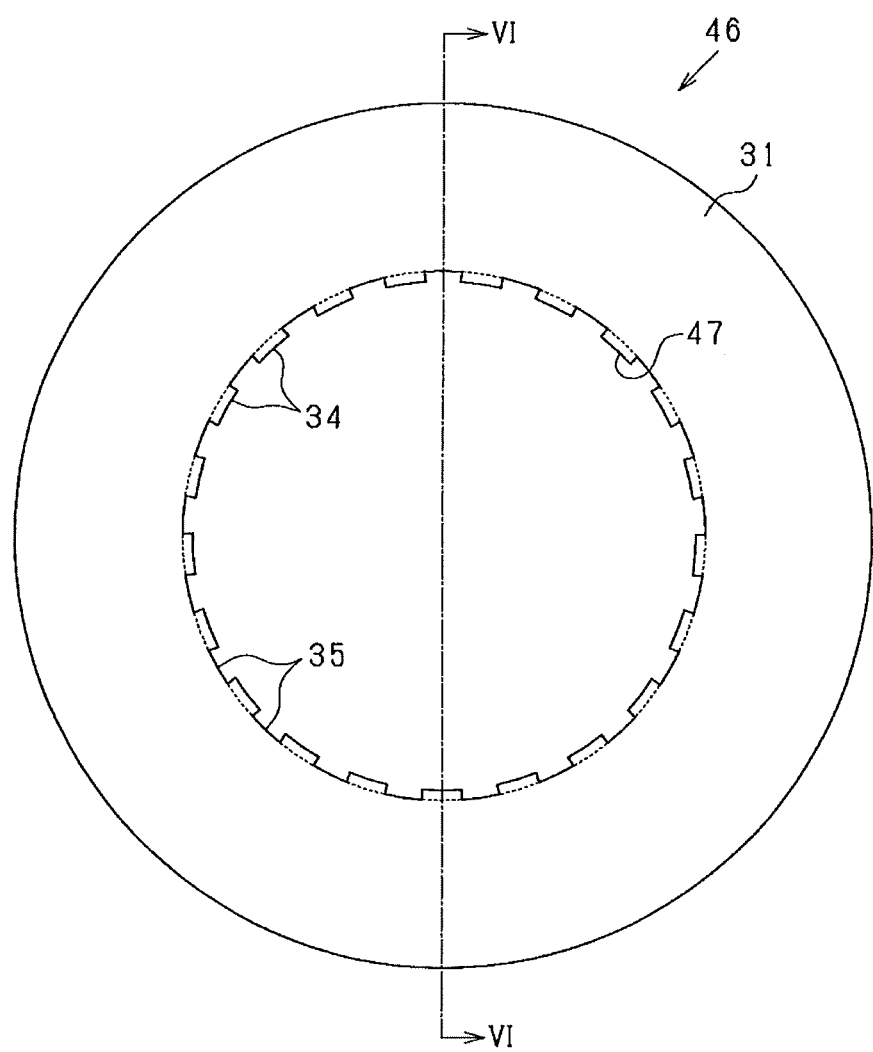
FIG. 5 is a plan view showing a sliding plate member.
Figure 6:
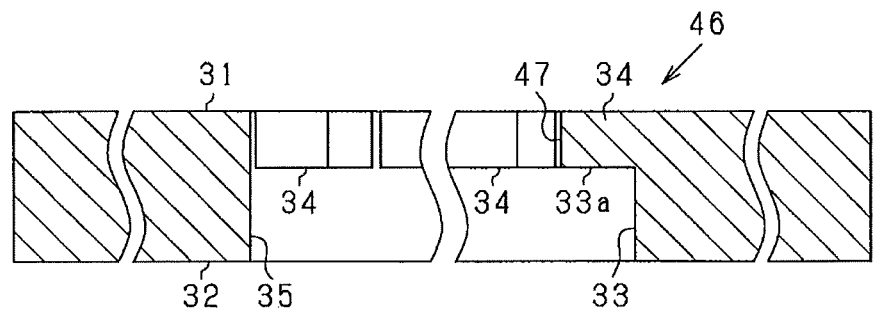
FIG. 6 is a sectional view in FIG. 5.

As shown in FIGS. 5 and 6, the sliding plate member 46, which is an annular flat plate, has the pair of sliding surfaces 31 and 32 formed on the front and back surfaces thereof. The sliding plate member 46 is formed through casting or the like. An insertion hole 47 into which the cylindrical portion 21 of the hat member 41 is inserted is formed in a center portion of the sliding plate member 46. The diameter of the insertion hole 47 is slightly smaller than the outer diameter of the cylindrical portion 21 of the hat member 41. On the inner circumference surface which defines the insertion hole 47, the inside groove 33 is formed on the side toward the inside sliding surface 32, and the plurality of inner peripheral protrusions 34 are formed on the side toward the outside sliding surface 31. Each penetration recess 35 is formed between adjacent inner peripheral protrusions 34. Therefore, the plurality of inner peripheral protrusions 34 and the plurality of penetration recesses 35 are alternatingly provided on the inner circumference surface which defines the insertion hole 47.

The hat member 41 and the sliding plate member 46, which are prepared as described above, are integrally connected together using a disc rotor production apparatus 60 as shown in FIG. 7, whereby the disc rotor 10 is produced. The disc rotor production apparatus 60 connects the hat member 41 and the sliding plate member 46 by forming the second portion 26 (see FIGS. 2B and 2C) through plastic working on the cylindrical portion 21 of the hat member 41 and causing the second portion 26 to pinch the inner peripheral protrusions 34 of the sliding plate member 46 in cooperation with the first portion 25.

First, the structure of the disc rotor production apparatus 60 will be described. The disc rotor production apparatus 60 includes a rotary base 61, a forming die 62, a pressing mechanism 63, and a plastic working mechanism 64. The rotary base 61 includes a rotary shaft 71 extending in the vertical direction. The rotary shaft 71 is provided in a rotational drive unit 72 including a motor or the like. As a result of drive by the rotational drive unit 72, the rotary shaft 71 rotates about its center axis C2.

Figure 8:
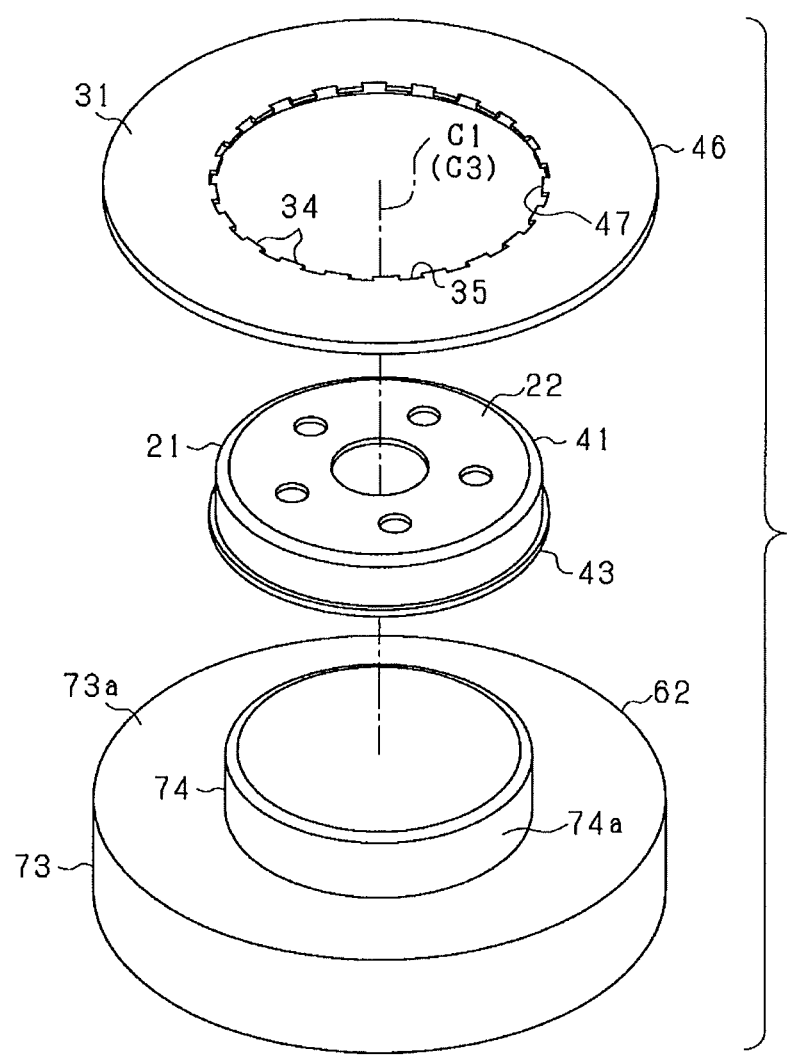
FIG. 8 is an exploded perspective view showing temporary assembling of the hat member and the sliding plate member.

The forming die 62 holds a temporary assembly K of the hat member 41 and the sliding plate member 46 and serves as a forming mold when plastic working is performed on the cylindrical portion 21 of the hat member 41. The forming die 62 corresponds to the temporary assembly holding portion. The forming die 62 is provided at a distal end portion of the rotary shaft 71 and rotates together with the rotary shaft 71. As shown in FIG. 8 as well, the forming die 62 has two approximately circular columnar portions having different diameters. These two circular columnar portions are provided in such a manner as to share a common center axis C3. The forming die 62 is provided on the rotary shaft 71 in such a manner that the center axis C3 coincides with the center axis C2 of the rotary shaft 71.

Figure 9:
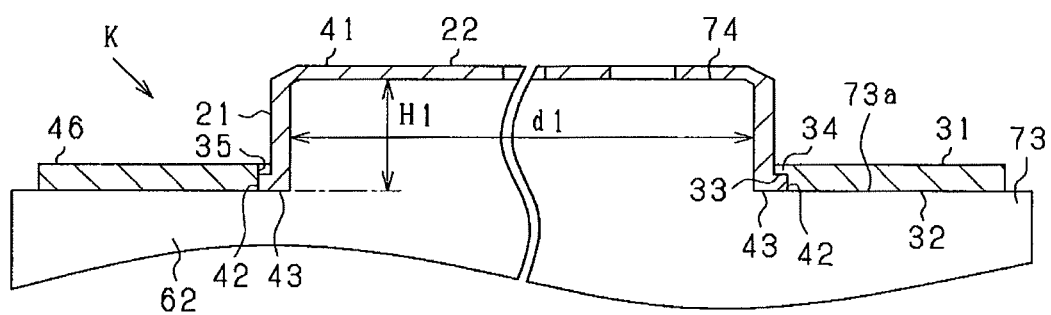
FIG. 9 is a view showing a cross section of a temporary assembly and a forming die which holds the temporary assembly.

As shown in FIG. 8, one of the two circular columnar portions constituting the forming die 62 is a large diameter portion 73 having a large diameter, and the other is a small diameter portion 74 whose diameter is smaller than that of the large diameter portion 73. The diameter of the large diameter portion 73 is greater than that of the sliding plate member 46. The small diameter portion 74 is provided on a top surface 73a of the large diameter portion 73. The small diameter portion 74 has dimensions approximately equal to those of a circular columnar region R formed inside the cylindrical portion of the hat member 41. Namely, the diameter d1 of the small diameter portion 74 (see FIG. 9) is approximately the same as the diameter d2 of the circular columnar region R formed inside the cylindrical portion (see FIG. 4). Also, the height H1 of the small diameter portion 74 (see FIG. 9) is approximately the same as the height H2 of the circular columnar region R (see FIG. 4). Therefore, when the hat member 41 is fitted onto the small diameter portion 74, as shown in FIG. 9, the entire region of the inner surface of the hat member 41 comes into contact with the entire region of an outer surface 74a of the small diameter portion 74, and the opening-side end surface 43 of the flange portion 42 comes into contact with the top surface 73a of the large diameter portion 73.

Referring back to FIG. 7, the pressing mechanism 63 is provided above the forming die 62. The pressing mechanism 63 has a movable shaft 75 which is coaxial with the center axis C2 of the rotary shaft 71 and extends in the axial direction thereof. The movable shaft 75 is provided in a pressing drive unit 76 including a cylinder or the like. As a result of drive by the pressing drive unit 76, the movable shaft 75 moves in the vertical direction. A pressing portion 77 is provided at a distal end portion of the movable shaft 75. The pressing portion 77 has the shape of a circular plate having a diameter smaller than that of the small diameter portion 74 of the forming die 62. As a result of upward and downward movements of the movable shaft 75, the pressing portion 77 moves between a standby position set to be located above the forming die 62 and a pressing position at which the pressing portion 77 presses, from the upper side, the temporary assembly K held by the forming die 62. The movable shaft 75 is configured such that it can perform following rotation about the center axis C2 in addition to the above-described upward and downward movements.

The plastic working mechanism 64 is provided sideward of the forming die 62 and the pressing mechanism 63. The plastic working mechanism 64 includes a roller 78 used for plastic working. The roller 78 has the shape of a truncated cone and is supported by a support portion 79 to be rotatable about a center axis C4 passing through the center of the upper surface portion thereof and the center of the bottom surface portion thereof. The center axis C4 of the roller 78 inclines with respect to the center axis C2 of the rotary shaft 71 extending vertically.

The support portion 79 is connected to a roller moving apparatus 80. The roller 78, supported by the support portion 79, can be moved by the roller moving apparatus 80 in a direction away from the forming die 62 and the pressing mechanism 63 and a direction toward them. Further, in a state in which the roller 78 is disposed above the forming die 62, the roller 78 can be moved upward and downward.

Figure 7A:
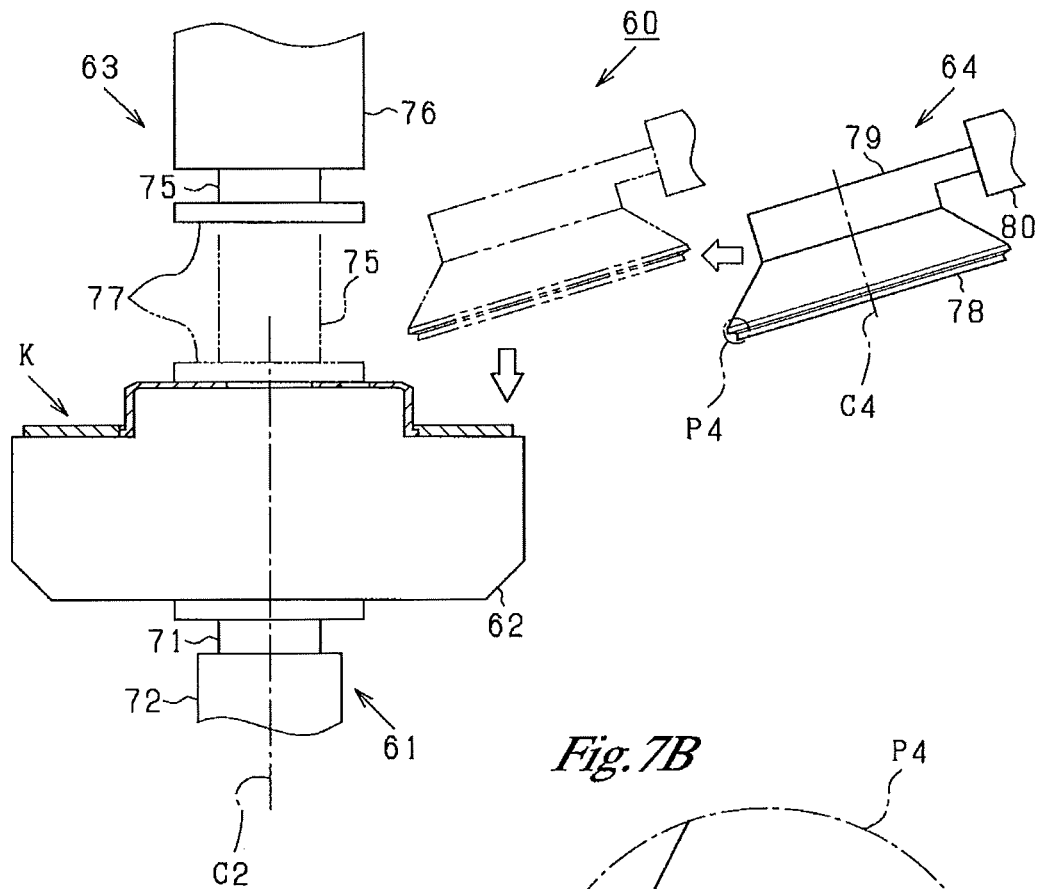
FIG. 7A is a schematic view showing a disc rotor production apparatus.
Figure 7B:
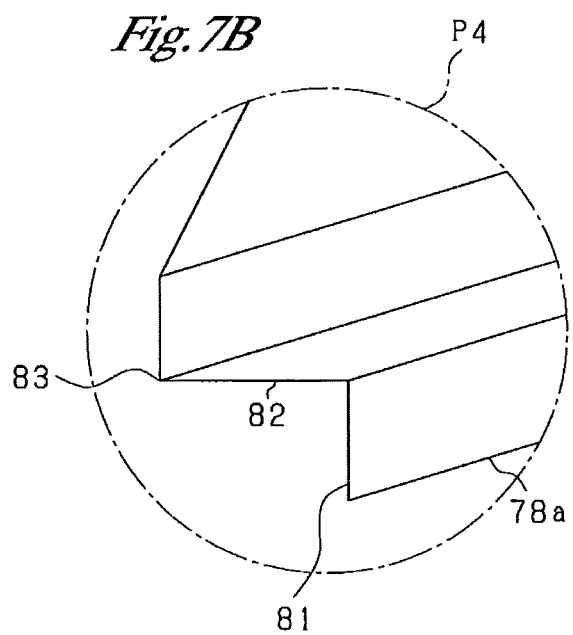
FIG. 7B is a partial enlarged view showing a part P4 in FIG. 7A.

As shown in FIG. 7B, a groove for plastic working 81 serving as a forming space is formed along the outer peripheral edge of a bottom surface 78a of the roller 78. The groove for plastic working 81 is recessed from the bottom surface 78a and extends over the entire region of the outer peripheral edge in the circumferential direction. The groove for plastic working 81 is open sideward and opens toward the bottom surface side. In the case where the roller 78 is brought into contact with the cylindrical portion 21 of the temporary assembly K so as to perform plastic working on the outer periphery of the cylindrical portion 21, the groove for plastic working 81 is open toward the center axis C1 of the cylindrical portion 21 (the center axis C2 of the rotary shaft 71) and is open toward the flange portion 42.

The groove for plastic working 81 has a groove bottom surface 82 which extends horizontally and a corner portion for plastic working 83 which is formed along the outer peripheral edge of the groove bottom surface 82 and extends approximately perpendicularly to the groove bottom surface 82. The corner portion for plastic working 83 also extends over the entire region of the outer peripheral edge of the bottom surface 78a in the circumferential direction. The corner portion for plastic working 83 corresponds to the plastic working portion.

Through use of the hat member 41 and the sliding plate member 46 which are individually manufactured as described above, the disc rotor 10 is produced by the following method in which the disc rotor production apparatus 60 having the above-described configuration is utilized.

First, the movable shaft 75 of the pressing mechanism 63 is moved upward so as to dispose the pressing portion 77 at the standby position spaced from the forming die 62. Then, as shown in FIG. 8, the hat member 41 is fitted onto the small diameter portion 74 of the forming die 62. As a result, as shown in FIG. 9, the entire region of the inner surface of the hat member 41 comes into contact with the entire region of the outer surface 74a of the small diameter portion 74, and the opening-side end surface 43 of the flange portion 42 comes into contact with the top surface 73a of the large diameter portion 73.

Next, the sliding plate member 46 is combined with the hat member 41 such that the cylindrical portion 21 of the hat member 41 is inserted into the insertion hole 47 of the sliding plate member 46. As described above, the diameter of the insertion hole 47 is slightly smaller than the outer diameter of the cylindrical portion 21 of the hat member 41. Therefore, the cylindrical portion 21 is press-fitted into the insertion hole 47 of the sliding plate member 46 until the inside sliding surface 32 comes into contact with the top surface 73a of the large diameter portion 73. As a result, as shown in FIG. 9, the flange portion 42 of the hat member 41 is accommodated in the inside groove 33 and the penetration recesses 35 of the sliding plate member 46. In this case, in the regions where the inside groove 33 is present, the flange portion 42 is in contact with the inner peripheral protrusions 34. Meanwhile, in the regions where the penetration recesses 35 are present, open spaces are present above the flange portion 42. This is the temporary assembly K.

Next, the movable shaft 75 of the pressing mechanism 63 is moved downward to its pressing position (position indicated by two-dot chain lines in FIG. 7A). At the pressing position, the pressing portion 77 comes into contact with the attaching plate portion 22 of the hat member 41 and presses and holds the temporary assembly K from the upper side. Then, the rotary shaft 71 and the forming die 62 are rotated by activating the rotational drive unit 72. At this time, the pressing portion 77 and the movable shaft 75 rotate together with the forming die 62.

In the state in which the forming die 62 is rotating, the roller 78 is moved to a position at which the corner portion for plastic working 83 of the roller 78 is disposed above the cylindrical portion 21 of the temporary assembly K. The roller 78 is further moved downward from that position. As a result, the corner portion for plastic working 83 comes into contact with the cylindrical portion 21, and the roller 78 rotates about the center axis C4 to follow the rotation of the forming die 62.

Figure 10A:
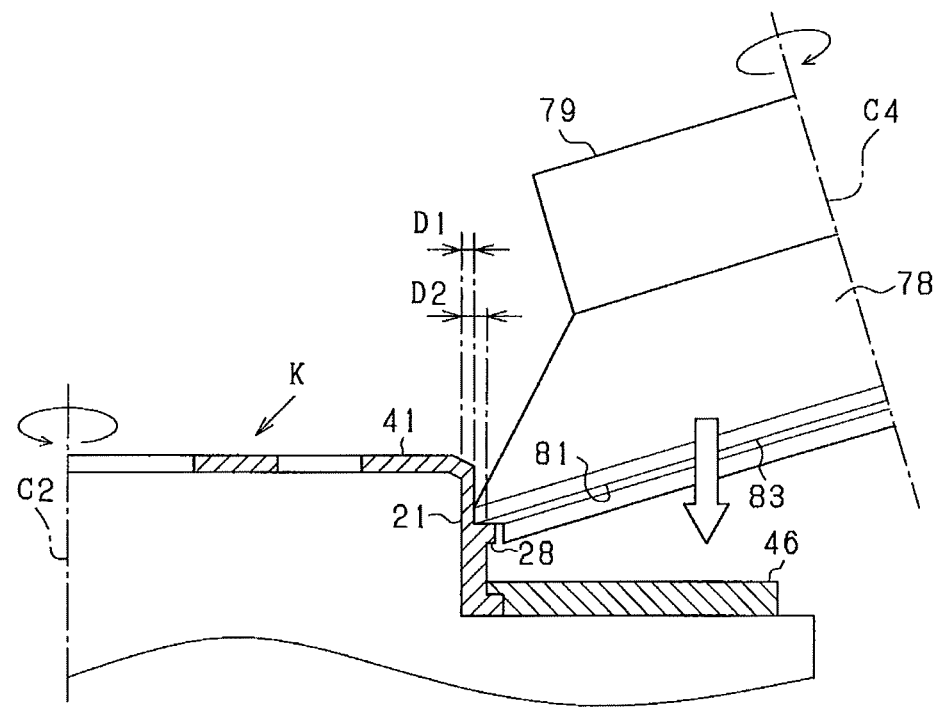
FIGS. 10A-10C are a set of views describing a method of plastically deforming a cylindrical portion.

When the roller 78 is further moved downward from that position, as shown in FIG. 10A, an outer peripheral portion of the cylindrical portion 21 is plastically deformed by the rotating corner portion for plastic working 83, and the outer peripheral portion is compressed to a region on the flange portion 42 side. As a result of this plastic deformation, the thickness of the cylindrical portion 21 decreases from the initial thickness D2 and becomes equal to the thickness D1 of the cylindrical portion 21 of the hat portion 11 of the disc rotor 10. Notably, even when the cylindrical portion 21 decreases in wall thickness, its hardness increases as a result of plastic working. Therefore, the thickness D1 of the cylindrical portion 21 is set such that the cylindrical portion 21 can have a sufficient strength after the plastic work.

At that time, a portion of the metallic material (aluminum alloy) of the cylindrical portion 21 plastically deformed by the corner portion for plastic working 83 is introduced into the groove for plastic working 81 which is open sideward and toward the bottom surface side. The introduced metallic material forms a flange-shaped annular protrusion 28 which protrudes sideward from the outer peripheral surface 21a of the cylindrical portion 21 and extends over the entire region of the outer peripheral surface 21a in the circumferential direction.

Figure 10B:
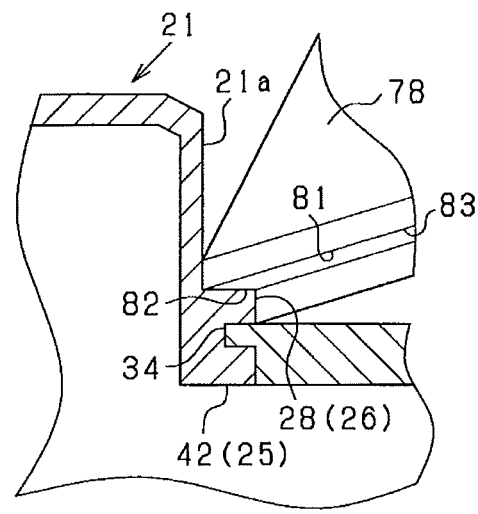

After that, when the roller 78 is further moved downward, the amount of the metallic material plastically deformed and compressed by the corner portion for plastic working 83 increases gradually. As a result, as shown in FIG. 10B, the annular protrusion 28 fills the entire internal space of the groove for plastic working 81. The roller 78 is moved downward until the annular protrusion 28 comes into contact with the inner peripheral protrusions 34 of the sliding plate member 46. At that time, the annular protrusion 28 comes into contact with the inner peripheral protrusions 34 while being pressed by the groove bottom surface 82 of the groove for plastic working 81. As a result, the inner peripheral protrusions 34 are pinched by the flange portion 42 and the annular protrusion 28. Namely, the flange portion 42 becomes the first portion 25, the annular protrusion 28 formed by the plastic working becomes the second portion 26, and the inner peripheral protrusions 34 are pinched by the first portion 25 and the second portion 26.

Figure 10C:
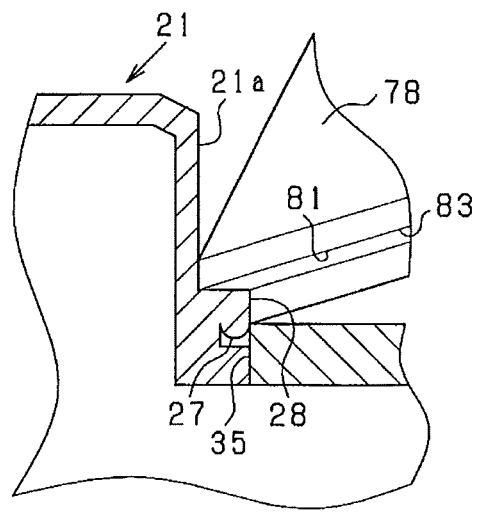

Also, in this state, in the regions of the inner peripheral edge portion 13 of the sliding plate member 46 where the penetration recesses 35 are present, the plastically deformed and compressed metallic material of the cylindrical portion 21 is introduced not only into the groove for plastic working 81 but also into the penetration recesses 35. Therefore, as shown in FIG. 10C, the annular protrusion 28 partially protrudes into the penetration recesses 35 and form the convex portions 27 such that each convex portion 27 comes into contact with the side surfaces 35a and 35b of the corresponding penetration recess 35, which surfaces are located on the opposite sides thereof in the circumferential direction (see FIG. 1).

Through the above-described steps, the hat member 41 and the sliding plate member 46 are integrally connected, whereby the disc rotor 10 is produced. After that, the roller 78 is returned to the original or standby position, and the rotations of the rotary shaft 71 and the forming die 62 are stopped. Further, the movable shaft 75 of the pressing mechanism 63 is moved upward and returned to the standby position. The assembly of the hat member 41 and the sliding plate member 46 integrally connected is removed from the forming die 62 as the disc rotor 10 having the hat portion 11 and the sliding plate portion 12.

The disc rotor 10, the production method therefore, and the disc rotor production apparatus 60 used for production of the disc rotor 10, which are according to the present embodiment and have the above-described features, yield the following effects.

(1) In the disc rotor 10, the inner peripheral protrusions 34 of the sliding plate portion 12 are pinched by the first portion 25 and the second portion 26 provided on the hat portion 11, whereby the hat portion 11 and the sliding plate portion 12 are connected and integrated in such a manner that separation of the hat portion 11 and the sliding plate portion 12 is difficult. As a result, the strength of the disc rotor 10 can be secured despite employment of a two-piece structure.

(2) In production of the disc rotor 10, in the temporary assembly K of the hat member 41 and the sliding plate member 46, the second portion 26 is formed by plastically deforming an outer peripheral portion of the cylindrical portion 21 and pinches the inner peripheral protrusions 34 in cooperation with the first portion 25 (the flange portion 42). In this method, the only requirement is plastically deforming the outer peripheral portion of the cylindrical portion 21 toward the first portion 25. Therefore, the process of forming the second portion 26 does not require high accuracy and does not require additional operation such as crimp-fixing. As a result, as compared with the conventional technique which requires, for example, the operation of fitting concave and convex portions and the operation of crimp-fixing, the production cost of the disc rotor 10 can be reduced and productivity can be increased.

(3) In the disc rotor 10, the convex portions 27 provided on the second portion 26 protrude into the penetration recesses 35 of the sliding plate portion 12 such that each convex portion 27 comes into contact with the side surfaces 35a and 35b of the corresponding penetration recess 35 located on the opposite sides thereof in the circumferential direction. As a result, relative rotation of the hat portion 11 and the sliding plate portion 12 is restrained, and the strength of the disc rotor 10 in the rotation direction can be secured. The penetration recesses 35 are provided at a plurality of positions along the circumferential direction of the sliding plate portion 12, and the convex portions 27 project into the respective penetration recesses 35. The strength in the rotation direction attained through restriction of relative rotation can be increased further.

(4) The convex portions 27 projecting into the penetration recesses 35 are formed simultaneously with the formation of the second portion 26 through plastic deformation of the outer periphery side of the cylindrical portion 21 in the temporary assembly K. Since the connection between the hat portion 11 and the sliding plate portion 12 and the restriction of relative rotation of the two portions are simultaneously realized by the operation of plastically deforming the cylindrical portion 21, the disc rotor 10 can be easily produced. Also, simultaneous formation of the convex portions 27 and the second portion 26 contributes to reduction of production cost and improvement of productivity.

(5) The first portion 25 of the hat portion 11 (the flange portion 42 of the hat member 41) is accommodated in the inside groove 33 formed on the sliding plate portion 12 (the sliding plate member 46), and in the disc rotor 10, the first portion 25 does not protrude from the inside sliding surface 32 of the sliding plate portion 12. Therefore, the first portion 25 does not restrict the space which is provided around the axle S so as to dispose components of a brake apparatus, etc.

(6) Along the inner peripheral edge portion 13 of the sliding plate portion 12, the plurality of inner peripheral protrusions 34 are provided at a position near the second portion 26, and the penetration recess 35 is formed in the gap between the adjacent inner peripheral protrusions 34. The penetration recesses 35 provide spaces into which the convex portions 27 protrude and spaces for accommodating the first portions 25. Therefore, production cost can be reduced as compared with the case where the spaces into which the convex portions 27 protrude and the spaces for accommodating the first portions 25 are formed separately. In particular, since the sliding plate portion 12 is produced by casting, the inner peripheral protrusions 34 and the penetration recesses 35 can be formed during the casting. Therefore, the cost reduction effect is high.

(7) In the disc rotor production apparatus 60, the roller 78 having the annular corner portion for plastic working 83 is supported to be rotatable, for following rotation, about the center axis C4 inclined with respect to the center axis C1 of the temporary assembly K (the center axis C2 of the rotary shaft 71). While this state is maintained, the corner portion for plastic working 83 is brought into contact with an outer peripheral portion of the cylindrical portion 21, thereby plastically deforming the outer peripheral portion.

Since the disc rotor production apparatus 60 is configured to cause the corner portion for plastic working 83 to obliquely come into contact with an outer peripheral portion of the cylindrical portion 21, the corner portion for plastic working 83 can be brought into contact with the cylindrical portion 21 more reliably for plastically deforming the outer peripheral portion thereof, as compared with the case where the center axis C4 of the roller 78 is disposed parallel to the center axis C2 of the rotary shaft 71. Also, this configuration can reduce the possibility that, when the roller 78 is moved downward to a position at which the annular protrusion 28 comes into contact with the inner peripheral protrusions 34 of the sliding plate member 46 and becomes the second portion 26, the bottom surface 78a of the roller 78 comes into contact with the sliding plate member 46 and damages the outside sliding surface 31 of the sliding plate member 46.

(8) The groove for plastic working 81 is provided on the roller 78 of the disc rotor production apparatus 60. Due to the presence of the groove for plastic working 81, the portion plastically deformed and collected by the corner portion for plastic working 83 moves toward the groove for plastic working 81 so that that portion is introduced into the space inside the groove. As a result, the second portion 26 is formed. Therefore, by ingeniously determining the shape of the groove for plastic working 81, the second portion 26 can be formed into an arbitrary shape; for example, the second portion 26 can be formed such that the second portion 26 has strength enough to pinch the inner peripheral protrusions 34 in cooperation with the first portion 25.

(9) Since the corner portion for plastic working 83 of the roller 78 is pressed against the cylindrical portion 21 of the temporary assembly K which rotates as a result of drive by the rotational drive unit 72, the roller 78 rotates about the center axis C4 to follow the rotation of the temporary assembly K. Since the corner portion for plastic working 83 plastically deforms the outer periphery of the cylindrical portion 21 while rotating, the frictional force acting on the corner portion for plastic working 83 due to friction between the corner portion for plastic working 83 and the outer periphery of the cylindrical portion 21 is reduced, whereby abrasion of the corner portion for plastic working 83 can be reduced.

Notably, the present disclosure is not limited to the above-described embodiment and may be practiced, for example, in the following forms.

Figure 11:
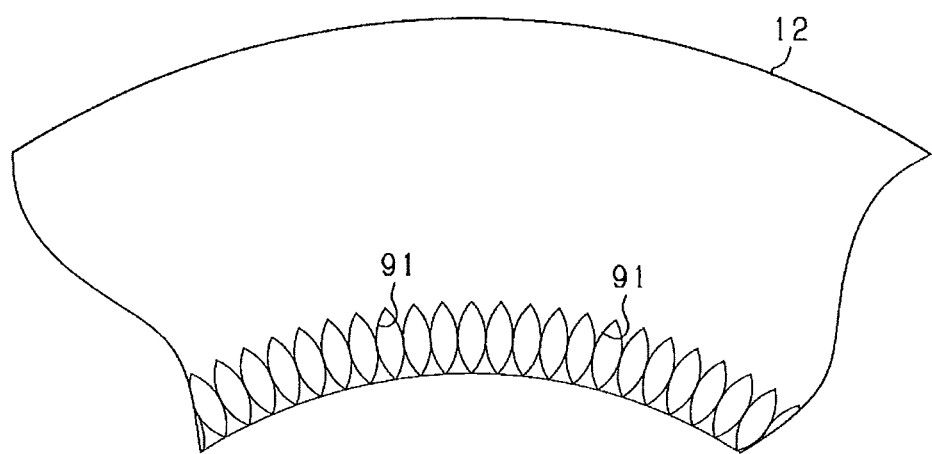
FIG. 11 is a partial plan view showing another example of the sliding plate member.

(a) In the above-described embodiment, the penetration recesses 35 are formed in the sliding plate portion 12 (the sliding plate member 46) and are used as concave portions into which the convex portions 27 protrude. Instead of this configuration, the concave portions may be grooves 91 whose example is shown in FIG. 11. In this case, the shape of the grooves 91 is not limited to the illustrated shape and may be any of various other shapes such as a rectangular shape and a semi-circular shape. Also, the number of the formed grooves 91 is arbitrary and is increased or decreased in accordance with the required strength in the rotational direction.

Figure 12A:
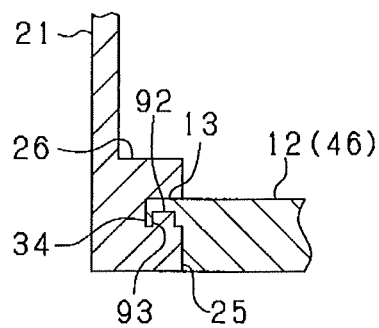
FIGS. 12A-12D are a set of partial sectional views showing other examples of the disc rotor.

(b) In the above-described embodiment, the convex portions 27 for restricting relative rotation are formed together with the second portion 26 by plastically deforming an outer peripheral portion of the cylindrical portion 21. Instead of this configuration, a structure in which the second portion 26 and the convex portions 27 are separately formed may be employed. For example, as shown in FIG. 12A, convex portions 92 may be formed on the first portion 25 and be fitted into grooves 93 formed in the inner peripheral protrusions 34. In this case, restriction of relative rotation is realized in a stage in which the hat member 41 is inserted into the insertion hole 47 of the sliding plate member 46.

Figure 12B:
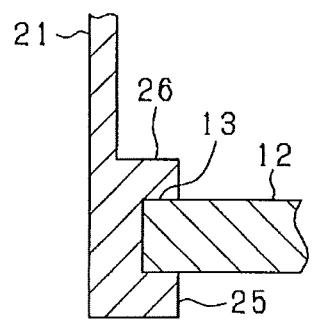

(c) In the above-described embodiment, the inside groove 33 is formed in the sliding plate portion 12, and the first portion 25 is accommodated therein. Instead of this configuration, the inside groove 33 may be omitted. In this case, as shown in FIG. 12B, the first portion 25 protrudes from the inside sliding surface 32 of the sliding plate portion 12, and the protrusive first portion 25 pinches the inner peripheral edge portion 13 in cooperation with the second portion 26. In this structure, the first portion 25 may hinder disposition of the components of the brake apparatus or the like. Therefore, it is preferred to employ a structure in which the first portion 25 is accommodated in the inside groove 33 as in the above-described embodiment.

Figure 12C:
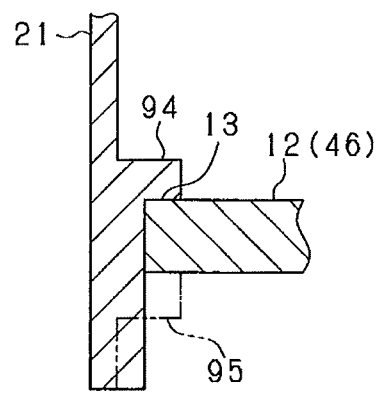

(d) In the above-described embodiment, the flange portion 42 is provided at the opening-side end portion of the hat member 41, and an outer peripheral portion of the cylindrical portion 21 is plastically deformed toward the flange portion 42 so as to form another portion. Instead of this configuration, a structure in which a portion corresponding to the flange portion 42 is formed by plastic deformation may be employed. For example, as shown in FIG. 12C, a sliding plate member 46 is attached from the opening side of the hat member 41 in such a manner that the sliding plate member 46 comes into contact with an annular protrusion 94 formed on the outer peripheral surface 21a of the cylindrical portion 21. Subsequently, an outer peripheral portion of the cylindrical portion 21, which portion is located on the opening side of the cylindrical portion 21, is plastically deformed from the opening side toward the annular protrusion 94, thereby forming an opening-side portion 95. As a result, the inner peripheral edge portion 13 of the sliding plate portion 12 is pinched by the annular protrusion 94 and the opening-side portion 95. In this case, the annular protrusion 94 corresponds to the first portion, and the opening-side portion 95 corresponds to the second portion.

Figure 12D:
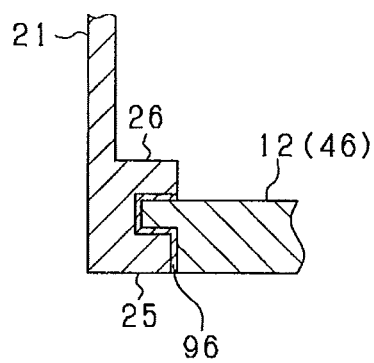

(e) In the above-described embodiment, the hat portion 11 and the sliding plate portion 12 are in direct contact with each other in a region where these portions are connected together. Instead of this configuration, as shown in FIG. 12D, an insulating material such as coating material or a corrosion preventing material 96 such as stainless steel may be interposed between the hat portion 11 and the sliding plate portion 12. The corrosion preventing material 96 can prevent corrosion, which would otherwise occur due to contact between different types of metals; i.e., between the aluminum alloy forming the hat portion 11 and the cast iron forming the sliding plate portion 12.

(f) In the above-described embodiment, the diameter of the insertion hole 47 formed in the sliding plate member 46 is slightly smaller than the outer diameter of the cylindrical portion 21 of the hat member 41, and the cylindrical portion 21 is press-fitted into the insertion hole 47. Instead of this configuration, a gap may be provided between the wall surface of the insertion hole 47 and the cylindrical portion 21.

(g) In the above-described embodiment, the disc rotor production apparatus 60 is configured to rotate the forming die 62 and allow the roller 78 to rotate as a follower. Instead of this configuration, the disc rotor production apparatus 60 may include a drive unit for driving the roller 78 and may be configured to allow the forming die 62 to rotate as a follower. Also, the roller 78 is rotatably supported by the support portion 79. Instead of this configuration, the support portion 79 may be configured to support the roller 78 without allowing its rotation. In the case of the structure in which the roller 78 does not rotate, the corner portion for plastic working 83 is not required to be formed into an annular shape. However, from the viewpoint of reducing the friction of the corner portion for plastic working 83, it is preferred to employ a structure which rotates the roller 78.

(h) In the above-described embodiment, in the disc rotor production apparatus 60, the rotary shaft 71, etc. are disposed such that the center axis C2 extends vertically. Instead of this configuration, the rotary shaft 71, etc. may be disposed such that the center axis C2 extends in a different direction such as a horizontal direction.

(i) In the above-described embodiment, in disc rotor production apparatus 60, the roller 78 has the shape of a truncated cone. Instead of this configuration, the roller 78 may have any shape, for example, the shape of a circular plate, so long as the roller 78 has the corner portion for plastic working 83 along the outer peripheral edge thereof.

(j) In the above-described embodiment, the corner portion for plastic working 83 is formed to extend approximately perpendicularly to the groove bottom surface 82 of the groove for plastic working 81. Instead of this configuration, the corner portion for plastic working 83 may be formed to have a more acute angle. Also, even in the case where the corner portion for plastic working 83 is formed to extend perpendicularly to the groove bottom surface 82, the groove bottom surface 82 is not required to be horizontal and may be an inclined surface which inclines with respect to the horizontal plane.

(k) In the above-described embodiment, the hat portion 11 (the hat member 41) is formed of aluminum alloy. Instead of this configuration, the hat portion 11 (the hat member 41) may be formed of any of other metallic materials. For example, the hat portion 11 (the hat member 41) may be formed of a light alloy, other than aluminum alloy, such as titanium alloy, or may be formed of steel which is higher in strength than cast iron.

The present disclosure has been described in conformity with examples but is not limited to the examples and the structures therein. The present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

DESCRIPTION OF REFERENCE NUMERALS

10 . . . disc rotor, 11 . . . hat portion, 12 . . . sliding plate portion, 13 . . . inner peripheral edge portion, 13a . . . inner peripheral plate surface (plate surface), 21 . . . cylindrical portion, 21a . . . outer peripheral surface, 25 . . . first portion, 26 . . . second portion, 27 . . . convex portion, inside groove (accommodation space), 34 . . . inner peripheral protrusion (protrusion), 35 . . . penetration recess (concave portion), 41 . . . hat member, 42 . . . flange portion, sliding plate member, 47 . . . insertion hole, 60 . . . disc rotor production apparatus, 62 . . . forming die (temporary assembly holding portion), 72 . . . rotational drive unit, 74 . . . small diameter portion (inside abutment portion), 78 . . . roller, 81 . . . groove for plastic working (forming space), 83 . . . corner portion for plastic working (plastic working portion).

The invention claimed is:

1. A disc rotor comprising:
   a hat portion having a cylindrical portion which an one end portion of the cylindrical portion is closed;
   an annular sliding plate portion having an insertion hole into which the cylindrical portion is inserted, being connected together with the hat portion in a state in which the cylindrical portion protrudes from the insertion hole,
   a first portion which protrudes outward from an outer peripheral surface of the cylindrical portion;
   a second portion which protrudes outward from an outer peripheral surface of the cylindrical portion in an opposite side of the first portion across the inner peripheral edge portion of the sliding plate portion in an axial direction of the cylindrical portion and is configured to pinch an inner peripheral edge portion of the sliding plate portion in corporation with the first portion, as a result of an outer peripheral portion of the cylindrical portion being plastically deformed by being compressed toward the first portion;
   a rotation restriction portion which is configured to restrict relative rotation of the hat portion and the sliding plate portion in a circumferential direction of the sliding plate portion; and
   the rotation restriction portion includes:
   a concave portion which is located at the inner peripheral edge portion of the sliding plate portion and is formed on a plate surface which faces the second portion; and
   a convex portion which is formed together with the second portion as a result of the outer peripheral portion of the cylindrical portion being plastically deformed by being compressed toward the first portion and which protrudes into the concave portion.

2. A disc rotor according to claim 1, wherein
   the first portion is provided at an opening-side end portion of the hat portion; and
   an accommodation space for accommodating the first portion is provided at the inner peripheral edge portion of the sliding plate portion.

3. A disc rotor according to claim 2, wherein
   the sliding plate portion has a plurality of protrusions each of which protrudes toward the insertion hole side from the inner peripheral edge portion at a position biased to a side of the second portion;
   the plurality of protrusions are provided that the protrusions are spaced from one another in a circumferential direction of the insertion hole; and
   a gap between the protrusions located adjacent to each other serves as the concave portion, and a space which is formed at a side of the first portion of the protrusions in the axial direction serves as the accommodation space.

4. A disc rotor production apparatus for producing a disc rotor by connecting together a hat member and a sliding plate member, the hat member having a cylindrical portion one end portion of which is closed and a flange portion provided at an opening-side end portion of the cylindrical portion, the sliding plate member having an insertion hole into which the cylindrical portion of the hat member is inserted,
   the disc rotor production apparatus comprising:
   a temporary assembly holding portion which is configured to hold a temporary assembly of the hat member and the sliding plate member in which the cylindrical portion of the hat member is inserted into the insertion hole of the sliding plate member and an inner peripheral edge portion of the sliding plate member is in contact with the flange portion; and
   a plastic working portion which is in contact with an outer peripheral portion of the cylindrical portion in the temporary assembly held by the temporary assembly holding portion and, in an opposite side of the flange portion across the inner peripheral edge portion of the sliding plate member in the axial direction of the cylindrical portion, is configured to plastically deform the outer peripheral portion of the cylindrical portion by compressing the outer peripheral portion toward the flange portion, thereby forming a second portion which is configured to pinch the inner peripheral edge portion in cooperation with the flange portion serving as a first portion.

5. A disc rotor production apparatus according to claim 4, wherein
   the plastic working portion has a forming space which is open toward a center axis of the cylindrical portion and toward the flange portion and into which a portion of the cylindrical portion plastically deformed by the plastic working portion is introduced to form the second portion.

6. A disc rotor production apparatus according to claim 4, further comprising:
   a rotational drive portion unit which is configured to rotate the temporary assembly holding portion about a center axis of the temporary assembly in a state in which the temporary assembly holding portion holds the temporary assembly; and
   a roller having the plastic working portion which is formed to be annular and which is supported to be rotatable about a center axis of the annular plastic working portion.

7. A roller which is applied to a disc rotor production apparatus, wherein
   the disc rotor production apparatus is configured to produce a disc rotor from a temporary assembly of a hat member and a sliding plate member, the hat member having a cylindrical portion one end portion of which is closed and a flange portion provided at an opening-side end portion of the cylindrical portion, the sliding plate member having an insertion hole into which the cylindrical portion of the hat member is inserted, the cylindrical portion of the hat member being inserted into the insertion hole of the sliding plate member and an inner peripheral edge portion of the sliding plate member is in contact with the flange portion,
   the roller is configured to be in contact with an outer peripheral portion of the cylindrical portion in the temporary assembly, and
   the roller comprises:
   an annular plastic working portion which, in an opposite side of the flange portion across the inner peripheral edge portion of the sliding plate member in the axial direction of the cylindrical portion, is configured to plastically deform the outer peripheral portion of the cylindrical portion by compressing the outer peripheral portion toward the flange portion, thereby forming a second portion which is configured to pinch the inner peripheral edge portion in cooperation with the flange portion serving as a first portion; and
   a forming space which is provided in the plastic working portion, which is open toward a center axis of the cylindrical portion and toward the flange portion, and into which a portion of the cylindrical portion plastically deformed by the plastic working portion is introduced to form the second portion.

8. A disc rotor production method of producing a disc rotor by connecting together a hat member and a sliding plate member, the hat member including a cylindrical portion one end portion of which is closed and a flange portion provided at an opening-side end portion of the cylindrical portion, the sliding plate member having an insertion hole into which the cylindrical portion of the hat member is inserted, the disc rotor production method comprising:

forming a temporary assembly by inserting the cylindrical portion of the hat member into the insertion hole of the sliding plate member until an inner peripheral edge portion of the sliding plate member is in contact with the flange portion; and plastically deforming an outer peripheral portion of the cylindrical portion in the temporary assembly by compressing the outer peripheral portion toward the flange portion, thereby forming a second portion which pinches the inner peripheral edge portion in cooperation with the flange portion serving as a first portion;

at the inner peripheral edge portion of the sliding plate member, a concave portion is formed on a plate surface which faces the second portion; and forming a convex portion which protrudes into the concave portion together with the second portion by plastically deforming the outer peripheral portion of the cylindrical portion by compressing the outer peripheral portion toward the flange portion.

* * * * *